United States Patent
Schwartz et al.

(10) Patent No.: US 12,081,359 B2
(45) Date of Patent: Sep. 3, 2024

(54) SYSTEM AND METHOD FOR A MODULAR ENTRY SYSTEM

(71) Applicant: LEVEL UP HOLDING CO., INC., Glendale, AZ (US)

(72) Inventors: John H. Schwartz, Glendale, AZ (US); Joseph Butler, Gilbert, AZ (US); R. Craig Boswell, Blaine, WA (US)

(73) Assignee: Level Up Holding Co., Inc., Glendale, AZ (US)

( * ) Notice: Subject to any disclaimer, the term of this patent is extended or adjusted under 35 U.S.C. 154(b) by 337 days.

(21) Appl. No.: 17/464,152

(22) Filed: Sep. 1, 2021

(65) Prior Publication Data

US 2022/0068067 A1 Mar. 3, 2022

Related U.S. Application Data (60) Provisional application No. 63/073,659, filed on Sep. 2, 2020.

(51) Int. Cl.
| | |
|---|---|
| *H04L 12/28* | (2006.01) |
| *G07C 9/29* | (2020.01) |
| *G08B 21/18* | (2006.01) |
| *H04W 4/80* | (2018.01) |
| *H04W 76/10* | (2018.01) |

(52) U.S. Cl.
CPC .............. *H04L 12/283* (2013.01); *G07C 9/29* (2020.01); *G08B 21/182* (2013.01); *H04L 12/281* (2013.01); *H04L 12/2829* (2013.01); *H04W 4/80* (2018.02); *H04W 76/10* (2018.02); *H04L 2012/2841* (2013.01)

(58) Field of Classification Search
CPC . H04L 12/283; H04L 12/281; H04L 12/2829; H04L 2012/2841; H04L 63/102; H04L 67/12; G07C 9/29; G07C 9/20; G08B 21/182; H04W 4/80; H04W 76/10; H04W 12/08
See application file for complete search history.

(56) References Cited

U.S. PATENT DOCUMENTS

| | | | |
|---|---|---|---|
| 11,328,514 B2 * | 5/2022 | Vancraybex | G06V 20/36 |
| 2016/0241559 A1 * | 8/2016 | Trani | H04W 12/08 |
| 2018/0007544 A1 * | 1/2018 | Grassel | H04W 4/50 |
| 2020/0028841 A1 * | 1/2020 | Mars | G06Q 20/308 |
| 2020/0100108 A1 * | 3/2020 | Everson | H04L 9/0825 |

* cited by examiner

*Primary Examiner* — James J Yang
(74) *Attorney, Agent, or Firm* — Noblitt & Newson, PLLC (57) ABSTRACT

A modular entry system according to various aspects of the present technology may comprise a main logic controller, an intercom system, and a card reader configured to conduct a secure device-to-device communication transaction with a wireless user device. The card reader may conduct the secure device-to-device communication transaction between the user device and modular entry system by utilizing a first wireless communication protocol in a first communication from the card reader to the user device and a second wireless communication protocol in a second response communication from the user device to the card reader. The modular entry system may also comprise a damage monitoring system configured to detect and report a potential damage event.

20 Claims, 8 Drawing Sheets

SYSTEM AND METHOD FOR A MODULAR ENTRY SYSTEM

CROSS REFERENCES TO RELATED APPLICATIONS

This application claims the benefit of U.S. Provisional Patent Application No. 63/073,659, filed Sep. 2, 2020, and incorporates the disclosure of the application by reference.

BACKGROUND OF THE TECHNOLOGY

Call box systems for access control, also known as telephone entry systems, have existed in many forms with varying functionality. These systems allow for a visitor to call a resident or property manager and request access to a door or gate via a phone call. Typically, these systems also include technology to allow the use of 125 kHz fob credentials and a key code entered on a keypad to allow entry access to the door or gate. Recently, more modern systems have incorporated a camera to allow video interaction between the caller and the resident. Some current systems even allow for the use of a smartphone as a method to gain access to a door or gate. Although the method of interacting with the telephone entry systems have changed to incorporate new technologies, they still provide the same basic functionality.

For example, card readers commonly use amplitude or frequency modulation fobs as credentials for access control. Each credential has a number embedded in the tag, and the passive tag is read from a "reader" by interpreting the modulated signals received back from the tag. Although smartphones have the ability to communicate with various types of devices, they generally do not have the capability to modulate the signal from a 125 kHz card reader thereby limiting their use with this type of entry system.

SUMMARY OF THE TECHNOLOGY

A modular entry system according to various aspects of the present technology may comprise a main logic controller, an intercom system, and a card reader configured to conduct a secure device-to-device communication transaction with a wireless user device. The card reader may conduct the secure device-to-device communication transaction between the user device and modular entry system by utilizing a first wireless communication protocol in a first communication from the card reader to the user device and a second wireless communication protocol in a second response communication from the user device to the card reader. The modular entry system may also comprise a damage monitoring system configured to detect and report a potential damage event.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various process steps. Such functional blocks may be realized by any number of components configured to perform the specified functions and achieve the various results. For example, the present technology may employ various types of computing platforms, communication protocols, and memory storage systems configured to operate over various types of communication networks, which may carry out a variety of operations suited to securely interacting with various types of user devices. In addition, the embodiments described are merely exemplary applications for the technology. Further, the present technology may employ any number of conventional techniques for data storage and retrieval, transmitting data, and communicating between devices. As used herein, a "user device" refers to any device having a central processing unit ("CPU") capable of performing computing functions and having the ability to communicate with other devices either through a wireless communication system or a wired communication system such as: smartphones, tablet computers, smart watches, or other similar portable electronic devices.

Systems and methods for a modular entry system according to various aspects of the present technology may operate in conjunction with various types of user devices. Various representative implementations of the present technology may be applied to various types of electronic access points and communication systems. For example, the described technology may be used to provide a more secure communication protocol for entry systems without the need for physical credentials.

Figure 1:
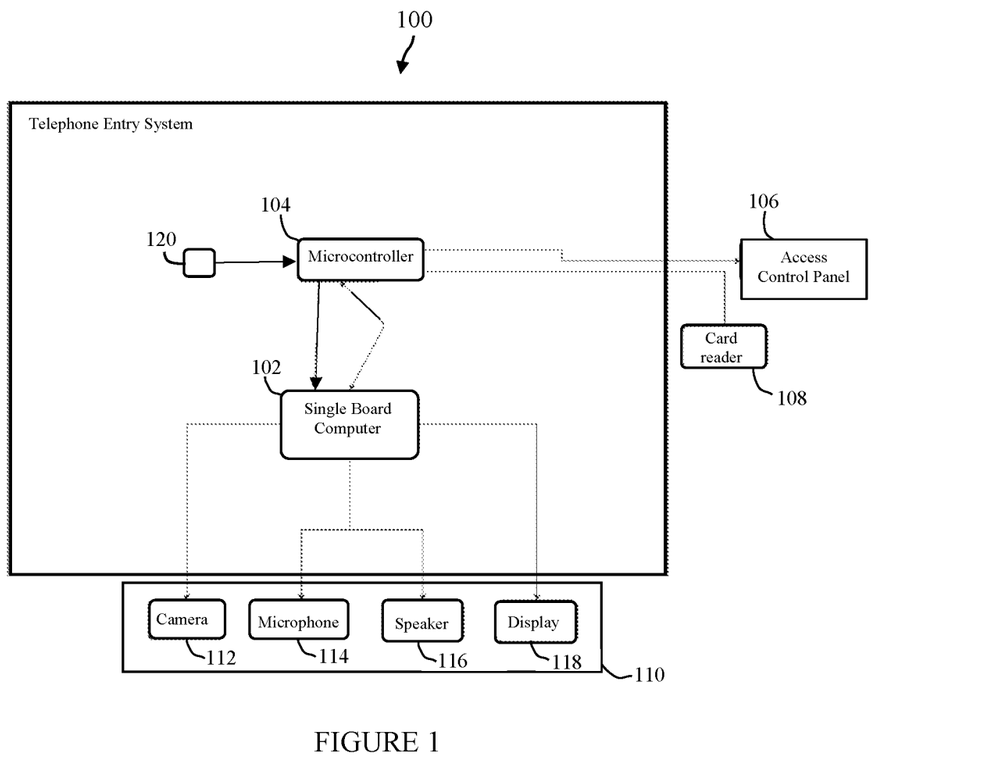
FIG. 1 representatively illustrates a block diagram of a modular entry system in accordance with an exemplary embodiment of the present technology.

Referring now to FIG. 1, the modular entry system 100 may comprise various hardware devices and software embedded with instructions that are configured to communicate with any other system or device such as a smart lock connected to an entry gate or a door in the immediate proximity of the modular entry system 100. The modular entry system 100 may comprise any suitable system or device for managing a communication between a particular location and the location of the intended call and sending an appropriate signal to a community controllable smart device associated with the modular entry system 100. In one embodiment, the modular entry system 100 may allow a visitor to a multi-unit property to make a call or send a message to a resident requesting entry through a nearby access/entry point. For example, the modular entry system 100 may be positioned next to a locking entry gate or access door and be configured to send a signal to the lock of the entry gate to open in response to an appropriate command.

In one embodiment, the modular entry system 100 may comprise a main logic board 102, a microcontroller 104, an accelerometer 120, an access control panel 106, a card reader 108, and an intercom system 110. The intercom system 110 may further comprise a video camera 112, a microphone 114, a speaker 116, a display screen 118, and a network connection. The modular entry system 100 may also be configured to accept various types of credentials such as: a multi-digit pin credential, a smart credential, a key fob credential, or QR code.

Figure 2A:
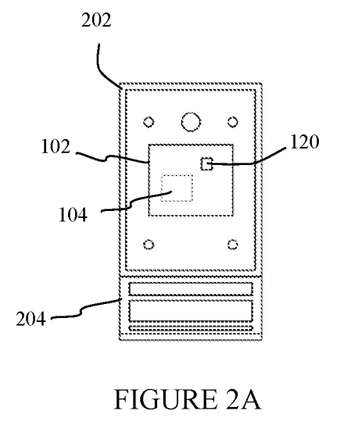
FIG. 2A representatively illustrates a front view of the modular entry system in accordance with an exemplary embodiment of the present technology.
Figure 2B:
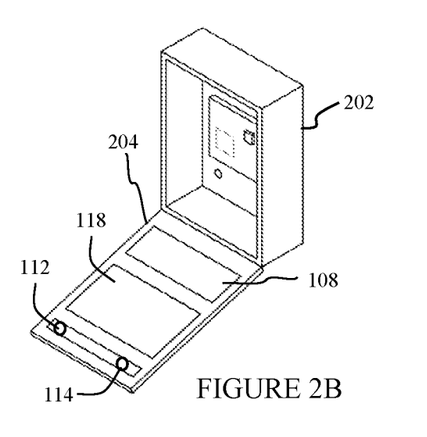
FIG. 2B representatively illustrates a front perspective view of the modular entry system in accordance with an exemplary embodiment of the present technology.

Referring now to FIGS. 2A and 2B, the modular entry system 100 may be positioned within an interior volume of a housing 202 having a front panel 204 that is pivotably connected to the housing 202 and configured to provide access to the interior volume of the housing 202. The front panel 204 may further be configured to be locked in the closed position to prevent undesired access to the interior volume of the housing 202. Additional peripheral components or portions of the intercom system 110 such as a keypad, video camera 112, microphone 114, a display screen 118, motion sensor, biometric scanner, and radio transceiver may be installed in the housing 202 or on the front panel 204 and connected to the main logic board 102 to allow for any desired manner of interaction with the modular entry system 100.

Figure 3:
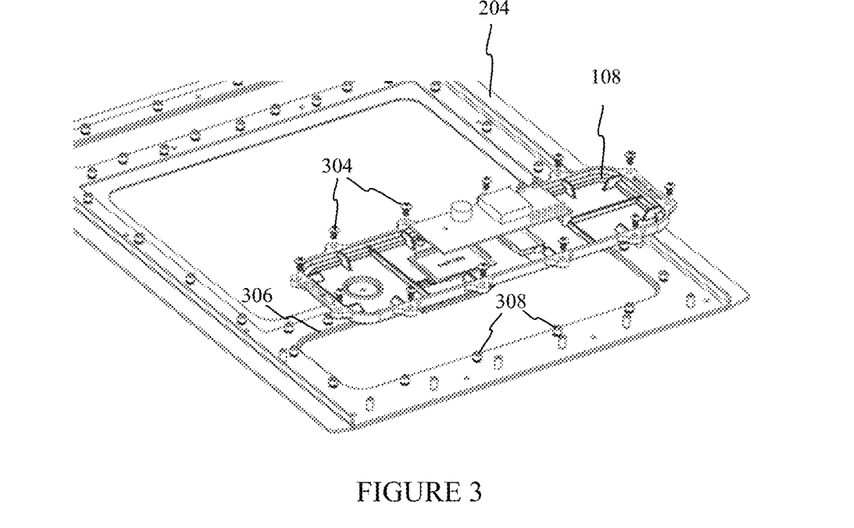
FIG. 3 representatively illustrates a removable peripheral device in accordance with an exemplary embodiment of the present technology.

The front panel 204 may be configured to allow for individual replacement of one or more installed peripherals or devices. This allows the modular entry system 100 to be easily upgradeable or repairable. For example, referring now to FIG. 3, in one embodiment, a peripheral such as the card reader 108 may be connected to a rear surface of the front panel 204 by one or more fasteners 304. The fasteners 304 may fit into a set of mating receivers or studs 308 to secure the peripheral in place. The front panel 204 or each peripheral may also include a sealing device such as a gasket 306 to prevent foreign objects or moisture from entering the interior volume of the housing 202.

Figure 4:
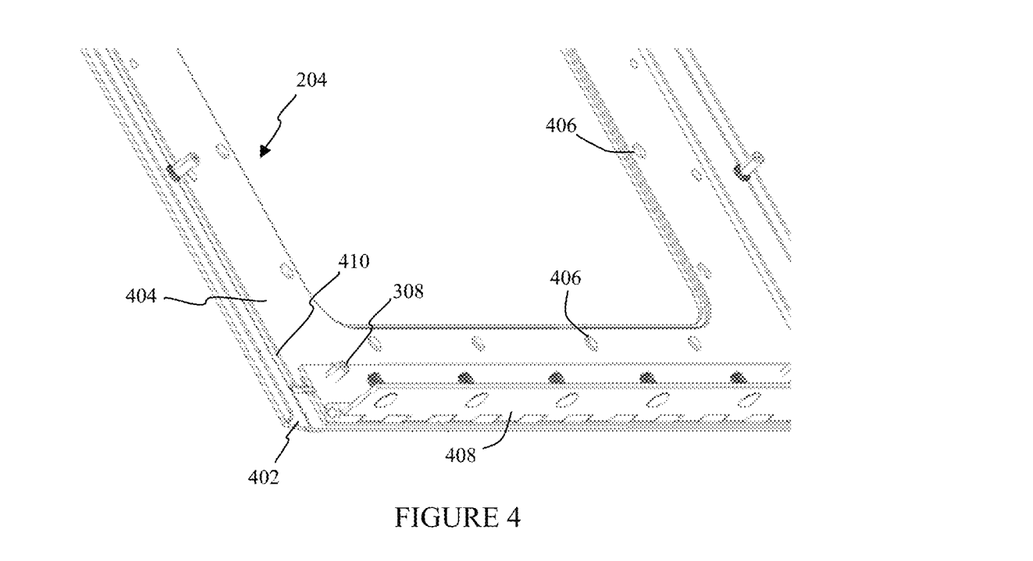
FIG. 4 representatively illustrates a front panel in accordance with an exemplary embodiment of the present technology.
Figure 5:
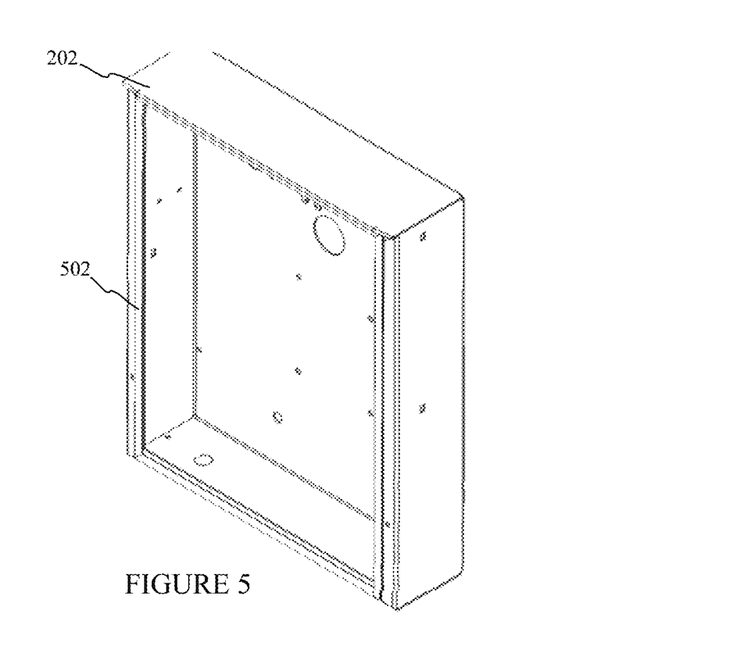
FIG. 5 representatively illustrates a housing and seal in accordance with an exemplary embodiment of the present technology.
Figure 6:
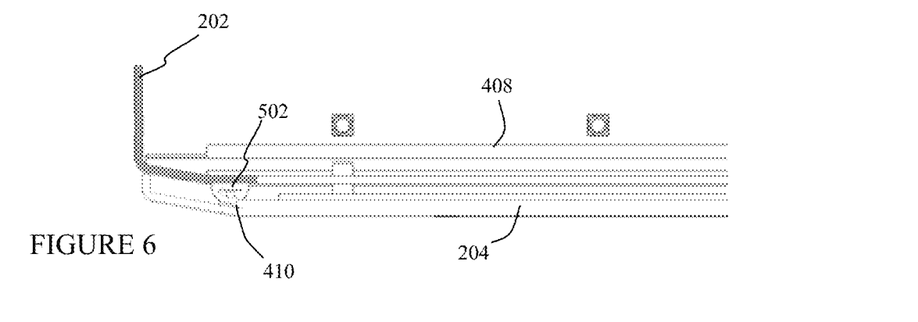
FIG. 6 representatively illustrates a top view of the front panel engaging the housing in accordance with an exemplary embodiment of the present technology.
Figure 7:
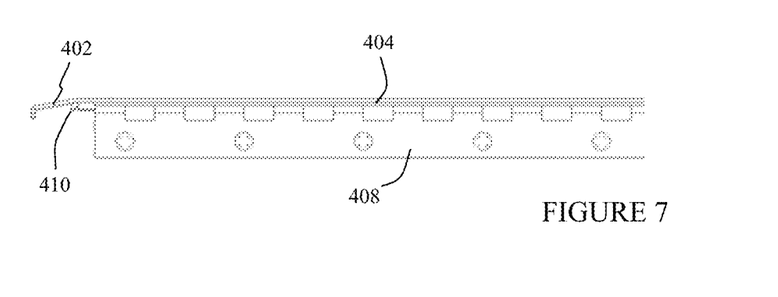
FIG. 7 representatively illustrates a top view of the front panel in accordance with an exemplary embodiment of the present technology.

Referring now to FIG. 4, the front panel 204 may comprise any suitable device or structure for closing off the interior of the housing 202. In one embodiment, the front panel 204 may be formed by coupling an exterior panel 402 to an interior panel 404. The exterior and interior panels 402, 404 may be coupled together by any method such as spot welding or by mechanical fasteners. For example, the exterior and interior panels 402, 404 may be welded together at discrete points 406 rather than along a continuous weld. The discrete weld points 406 may secure the exterior and interior panels 402, 404 together while also allowing each panel to have some ability to flex or be manipulated without directly impacting the other panel. For example, the interior panel 404 may comprise a plurality of studs 308 that are configured to allow the peripherals and a hinge plate 408 to be removably connected without damaging the exterior panel 402. Referring now to FIGS. 4-7, the interior panel 404 may further comprise an edge lip 410 that is bent approximately 90 degrees from a main body section of the interior panel 404 body and is configured to engage a housing seal 502 positioned along a periphery of the opening to the interior volume of the housing 202. Because the peripherals and the hinge plate 408 are coupled directly to the interior panel 404, the exterior panel 402 may remain free from distortions or blemishes that might result due to forces associated with the installation of the peripherals.

In addition to function with key fobs, RFID cards, entry codes and other commonly used methods, the modular entry system 100 is configured to communicate with various user devices to allow entry through a connected gate or access door. For example, a given user device may act as a smart credential incorporating one or more wireless technologies such as near-field communication (NFC) and Bluetooth low energy (BLE), separately or in combination, to allow the user device to perform a secure data exchange with the card reader 108 to grant access to an entry gate or access door connected to the modular entry system 100. The smart credential on the user device may be recognized by the modular entry system 100 which may be configured to communicate with the user device 114 via the card reader 108.

The card reader 108 may comprise various embodiments of systems and methods for reading, authenticating, and permitting access to the modular entry system 100 by users assigned different credentials (e.g., multiple residents, guests, and property managers). As detailed below, securing communications between various user devices 804 and the modular entry system 100 solve a technological problem associated with prior art smart devices in an unconventional way by using a unique combination of enhanced NFC and BLE communication protocols, coupled with private keys and a number used once ("nonce") mechanism for encrypted authentication messages. This process achieves secure data exchange between the user devices 804 and the modular entry system 100 to overcome technical shortcomings with conventional telephone entry systems. NFC as used with the present technology provides a security advantage when used in combination with BLE because NFC requires very close proximity (0-3 cm) which makes it difficult for man-in-the-middle ("MITM") attacks to which BLE may be susceptible given its range of up to several meters. Moreover, unlike existing technologies which require an internet connection to perform an authentication action, no internet connection is required. A further advantage provided by the disclosed technology is that it obviates the need for users to carry multiple authentication cards, key fobs, mobile devices and the like. Only a single user device 804 equipped with an appropriate mobile software application is required.

Figure 8:
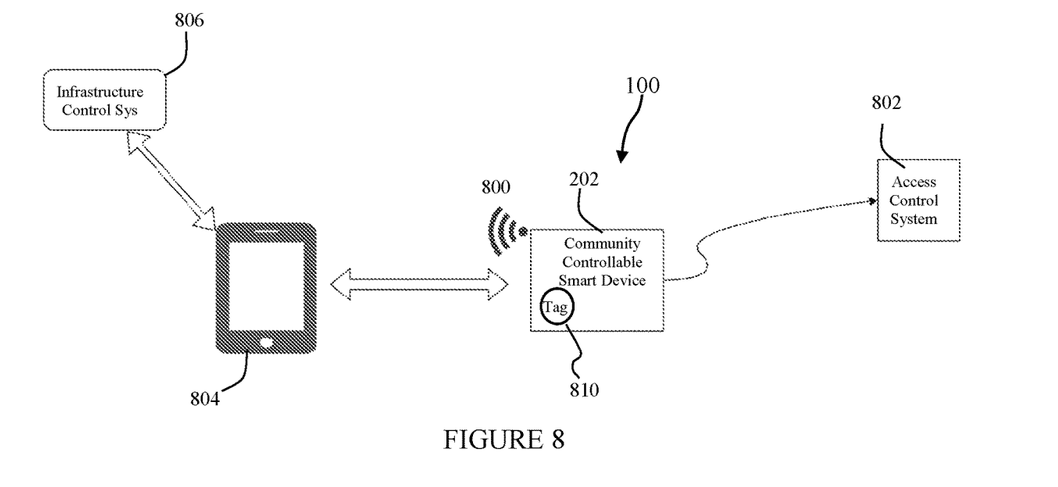
FIG. 8 representatively illustrates a block diagram of an embodiment of an access control system in accordance with an exemplary embodiment of the present technology.

With reference now to FIG. 8, a NFC tag 810 may be placed on or inside the housing 202 of the modular entry system 100. An access control system 802 in communication with the modular entry system 100 may assign each NFC tag 210 with a unique identification code or tag along with a specified action that allows for the user device 804 to authenticate the user's ability to interact with modular entry system 100. For example, the NFC tag 210 may comprise a uniform resource identifier ("URI") to prompt a mobile software application installed on the user device 804 to activate or otherwise respond to a set of information that is passed to the mobile software application for an action. In response, the user device 804 may perform an authentication against the user device 804 and modular entry system 100. If the authentication is approved, then a secure API request is made to a separate infrastructure control system 806 to allow the user device 804 to interact with the modular entry system 100.

For example, in one embodiment, the user device 804 may read a NFC tag 810 having an assigned URI, a device identifier ("ID"), and a set of action information. The URI causes the mobile software application on the user device 804 to open. The device ID and set of action information are passed to the mobile software application, which validates whether the user device 804 is authorized to control the modular entry system 100. If the user device 804 is authorized, the user device 804 initiates an API request to the infrastructure control system 806 which uses the device ID to map to the type of API request required for that particular device (e.g., unlock gate). For example, when the mobile software application reads the NFC tag 810, an unlock request may be initiated.

A first method of conducting a secure device-to-device communication transaction between the modular entry system 100 and the user device 804 utilizes the card reader 108 to perform an initial communication by transmitting the NFC tag 810 (emulation or otherwise) and a unique random encryption nonce to the user device 804 over a NFC protocol. In response, an encrypted access request is communicated from the user device 804 to the card reader 108 over a BLE protocol using the received nonce. In this embodiment, the modular entry system 100 is be configured with a NFC tag 810 such that a user device 804 is configured to function and act as a NFC reader.

An alternative method of conducting a secure device-to-device communication transaction between the modular entry system 100 and the user device 804 may comprise an initial communication from the modular entry system 100 via card reader 108 of a unique random encryption nonce communicated to the user device 804 as a BLE advertisement. In response to this initial communication, the user device 804 communicates a NFC tag 810 comprising an encrypted access request to the card reader 108 using the nonce received over the BLE protocol. In this embodiment, the modular entry system 100 may be configured to function as a NFC reader, while the user device 804 emulates the NFC tag 810.

Yet another method of communicating between the user device 804 and the card reader 108 may comprise performing a secure device-to-device communication through the use of a BLE connection from the card reader 108 to the user device 804 to send a nonce and an encrypted message between the card reader 108 and the user device 804. This allows the user device 804 to generate an access control request or an authentication with the card reader 108 to manipulate or control the modular entry system 100. Here, the modular entry system 100 is configured so that it only interacts with the user device 804 over BLE.

Referring again to FIG. 8, in one embodiment the user device 804 and card reader 108 of the modular entry system 100 may communicate wirelessly either through a NFC or BLE signal 800. The user device 804 may also communicate with the infrastructure control system 806 to synchronize a list of valid device IDs stored on the access control system 802. When the user device 804 performs a valid transaction with the card reader 108, the modular entry system 100 sends a user code to the access control system 802 and the user is allowed to control the modular entry system 100 with the user device 804. In another embodiment, instead of sending the user code to the access control system 802, the secure data exchange may also comprise allowing the user further control of the modular entry system 100 from the user device 804.

With respect to secure data exchange between devices, as mentioned above, it is not required that the user device 804 be connected to a server over the internet to make an access request. In addition, the modular entry system 100 may also support other widely used credentials, such as 125 kHz, 13.56 MHz cards, key fobs, and other physical credentials.

Unlike prior art communication systems for smart devices, the disclosed method provides a novel solution in the manner in which it causes the system to issue and use a nonce for an encryption scheme that is highly resistant to MITM attacks or unwanted credential requests. Various embodiments of the disclosed communication method comprise transfer of the nonce from a first communication path and then transmission of an encrypted message on a second communication path. In one example of the disclosed technology, NFC may be used to either initiate the transaction or complete the transaction. But NFC is not used to perform bidirectional communication. For this reason, BLE may be used to supplement the transaction. In either embodiment, there may be various additional stages in the transaction, each providing an additional layer of security.

For example, the encryption itself may be implemented using various advanced encryption standard ("AES") schemes, such as: counter mode ("CTR"), output feedback ("OFB"), cipher feedback ("CFB"), plaintext cipher block chaining ("PCBC"), cipher block chaining ("CBC"), electronic codeblock ("ECB"), and the like. The access control system 802 may use any suitable type of encryption such as 128-bit, 196-bit, 256-bit, and 512-bit encryption using the same logic as would be familiar to one of ordinary skill in the art only after becoming familiar with the teachings of the present technology. For example, in a CTR mode encryption scheme, an incremental counter is not used and instead the nonce may comprise 128-bit random numbers for each transaction.

Figure 9:
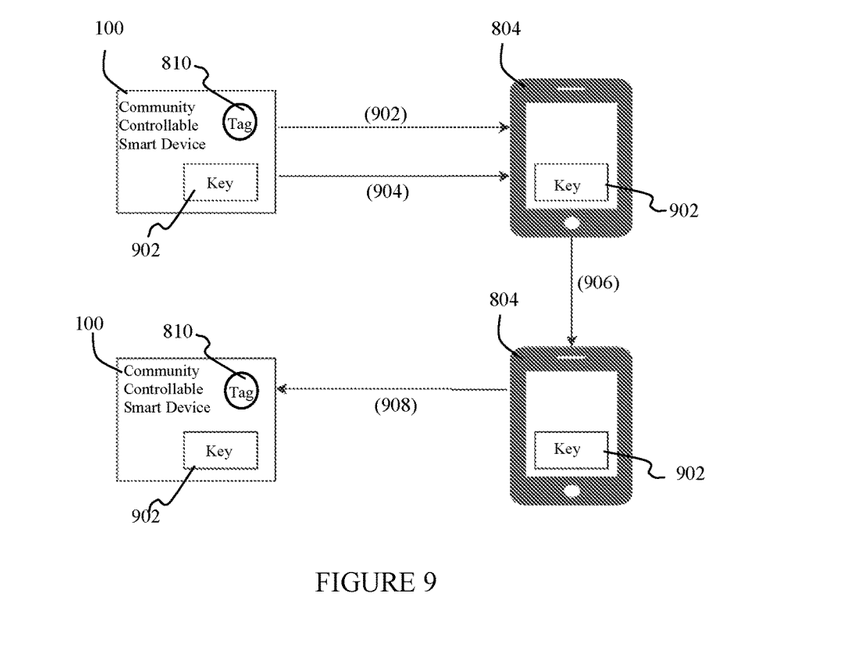
FIG. 9 representatively illustrates a block diagram illustrating an embodiment of a communication method of the access control system in accordance with an exemplary embodiment of the present technology.
Figure 10:
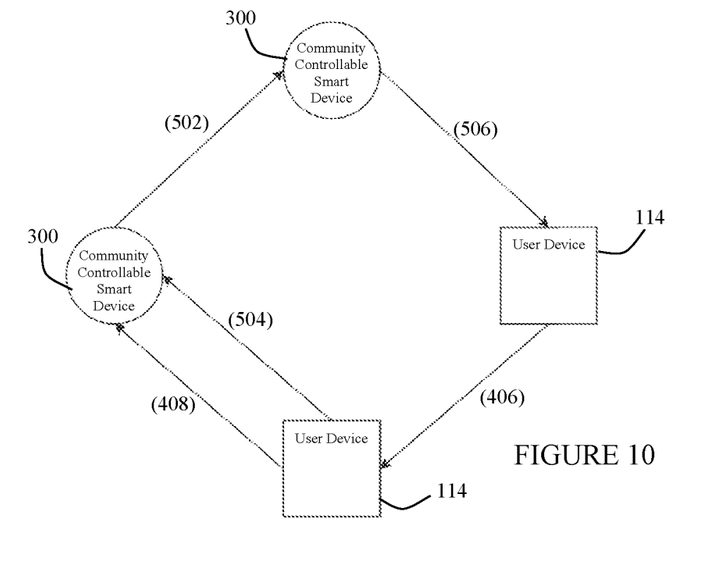
FIG. 10 representatively illustrates a block diagram illustrating an alternative embodiment of a communication method of the access control system in accordance with an exemplary embodiment of the present technology.

More specifically and with reference to the first example of a secure device-to-device communication transaction, and referring now to FIGS. 9 and 10, the first step of the transaction is for the modular entry system 100 to broadcast a unique device ID through a BLE advertisement (902) either via the card reader 108 or some other device. The mobile software application provides the user device 804 with a list of known device IDs with which it is allowed to communicate. The user device 804 may repeatedly scan for all device IDs and display to the user (e.g., via graphic user interface ("GUI") of the mobile software application) if the modular entry system 100 matches one of the device IDs in the list of all permitted devices. Once a user has selected the modular entry system 100, the user device 804 starts a NFC scan. The user presents the user device 804 to the modular entry system 100 and the user device 804 reads the NFC tag 810 presented by the modular entry system 100.

A second step of the transaction causes the user device 804 to read the NFC tag 810 data from the modular entry system 100 (904). This data may comprise any suitable information or fields such as: a URI unique to the mobile software application for interacting with the modular entry system 100, a transaction header of 64 bits, and a 128-bit random number, which is used as the nonce. The transaction header may comprise a transaction type or connection mode. For example, the transaction header could indicate whether a transaction is purely BLE or a combination of NFC and BLE. A unique transaction header may comprise a 64-bit long randomly picked bit pattern; however, the technology should not be viewed as being limited in this respect since the transaction header may also be less or more than 64 bits.

The mobile software application on the user device 804 may check that the transaction header matches a pre-arranged list of transaction headers for a valid transaction or connection type. A non-shareable private encryption key 902 may exist on both the user device 804 and the modular entry system 100.

In a third step of the transaction, the user device 804 then uses the 128-bit nonce, as well as the private encryption key 902 to encrypt a message to be sent back to the modular entry system 100 (906). The encrypted message comprises a transaction header and a user access code. The user access code could be Wiegand data or any access code up to 128 bits. The user device 804 then connects to the modular entry system 100 over BLE and sends the encrypted message (908). If the process does not time out and disconnect the modular entry system 100 from the user device 804, then the modular entry system 100 will decrypt the encrypted message using the nonce and private the encryption key 902 (1002).

The modular entry system 100 may include BLE programming that requires any device that connects to it to send information over BLE within a set period of time, such as 2 seconds, although other set periods of time in a range of about 1-5 seconds could also be used. After the set period of time, the modular entry system 100 will automatically disconnect if the required information is not sent (1004). This disconnect shortens the opportunity of time someone can maliciously attempt to send transactions to the modular entry system 100 in an attempt to circumvent the secured communication.

For example, when the user device 804 reads the NFC tag 210 from the modular entry system 100 (904), the modular entry system 100 may start a pre-programmed countdown. The pre-programmed countdown may be set to a short amount of time, such as 10 seconds; however, other amounts of time could also be designated, such as a value between 1-15 seconds. If the modular entry system 100 does not receive a valid BLE transaction from the user device 804 within the pre-programmed countdown, then the nonce is automatically reset (1006), and any transactions using the previous nonce are invalidated. Additionally, after each transaction attempt, the pre-programmed countdown will be repeated, and the nonce will be reset resulting in a second time out.

This second time out associated with the pre-programmed countdown, also reduces the amount of time someone can maliciously attempt to unravel the transaction and encryption scheme. To unravel the scheme, without knowing the private encryption key 902, a brute force attack would be required to guess the private encryption key 902. However, since the modular entry system 100 resets the nonce after each transaction attempt, an attacker would need to repeatedly read a new nonce over NFC, attempt a decryption, and transmit it over BLE. A forced delay may also optionally be implemented to cause the NFC tag 902 to update only after a set time delay, such as 2 seconds. Since the combination of this forced delay and the two-step NFC the BLE transaction would not take an insignificant amount of time, on the order of several seconds, it would be increasingly difficult to perform a brute force attack to determine private key 902. In addition, when this technology is implemented there may be an additional layer of security in the user code which is a unique code for that user to enter a specific door at a given time.

Because one of the transactions uses NFC (which requires close proximity), and the other uses BLE, someone trying to decipher the encryption and transaction scheme, would need to intercept both messages simultaneously. This would likely require the physical installation of a device on or inside the modular entry system 100 to read the NFC data (e.g., NFC tag 810), as well as a BLE device to pick up the wireless BLE transaction. Though not impossible, this provides another security measure to reduce the ability for someone to gain unauthorized access.

Figure 11:
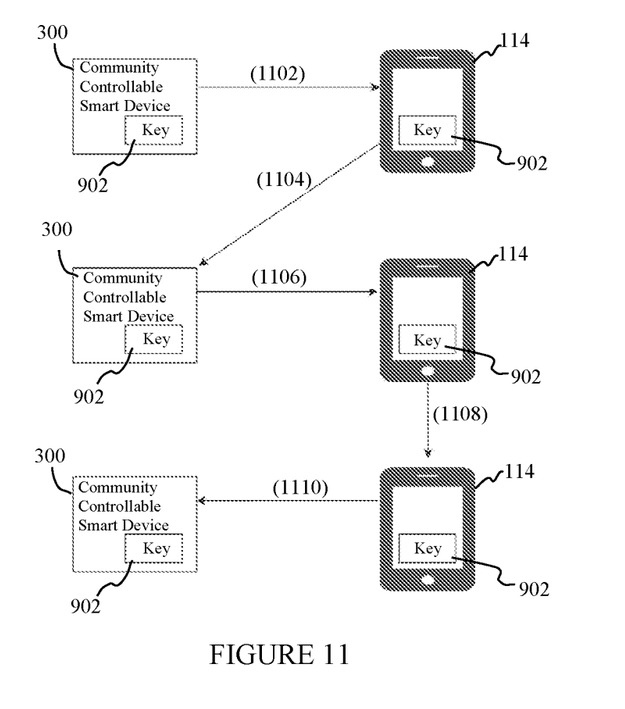
FIG. 11 representatively illustrates a block diagram illustrating another embodiment of a communication method of the access control system in accordance with an exemplary embodiment of the present technology.

Referring now to FIG. 11, in an alternative embodiment of a method of communication between the user device 804 and the modular entry system 100, the modular entry system 100 may broadcast a unique device ID through a BLE advertisement (1102). As detailed above, the user device 804 may comprise a list of known device IDs with which the user device 804 is allowed to communicate. Again, once the user has selected the modular entry system 100, the user device 804 connects to the modular entry system 100 (1104) over BLE and reads the transaction header (described above), as well as the 128-bit nonce (1106).

The user device 804 may then check that the transaction header matches a prearranged list of transaction headers for a valid transaction or connection type. The private encryption key 902 exists on both the user device 804 and the modular entry system 100. The user device 804 then uses the 128-bit nonce, as well as the private encryption key 902 to encrypt a message to be sent back to the modular entry system 100 (1108). The message contains a transaction header and a user access code. As above, the user access code could be Wiegand data or any access code up to 128 bits.

The user device 804 may then emulate the NFC tag 810 with the following information: a transaction header of 64 bits and a 128-bit encrypted message containing the user code. Subsequently, the user device 804 may be presented to the modular entry system 100, which reads the emulated NFC tag 810 (1110). The modular entry system 100 then decrypts the message (1002), verifies the transaction header, and sends the user code to the access control system for verification.

As similarly described above, the modular entry system 100 BLE programming requires any device that connects to it to send information via NFC within a short period of time. After the set period of time, the modular entry system 100 will automatically disconnect if the required information is not sent. This disconnect shortens the opportunity of time someone can maliciously attempt to send transactions to the modular entry system 100. As previously described, if the modular entry system 100 does not receive a valid NFC transaction from the user device 804 within the set period of time, then the nonce is automatically reset and any transactions using the previous nonce are invalidated.

With continued reference to FIGS. 10 and 11, in yet another embodiment of a secure method of communication, the first several steps in the transaction may be the same as described above (1102), (1104), (1106), and (1108). In this instance, however, the user device 804 causes a BLE message to be sent to the modular entry system 100. The BLE message may comprise a transaction header of 64 bits and a 128-bit encrypted message containing the user code (1110), although the technology should not be viewed as being limited in this respect as different sized transaction headers and encrypted messages could also be used. The modular entry system 100 may then decrypt the BLE message, verify the transaction header, and send the user code to an access control system 802 for verification (1002). Again, as described above, the modular entry system 100 may be programmed to require communications to be sent within a specified period of time or a disconnect procedure will take place and the nonce will be reset.

The modular entry system 100 may also be configured to accept a key fob or other physical credential in place of a smart credential. In this embodiment, data sent from a user device 804 to a NFC reader on the card reader 108 may comprise a unique access code. The NFC reader may transmit the access code to the access control system 802 via a Wiegand protocol; however, the technology should not be viewed as being limited in this respect since other access control protocols, such as OSDP, for example, could also be used. The NFC reader may also be configured to require NFC and BLE data exchange or just BLE exchange. By way of a nonlimiting example, BLE exchange may be employed at a vehicle gate where distance between the NFC reader and the user device 804 can exceed 10 meters. An additional layer of security includes authentication of a unique device ID for the NFC reader against resident and property in the manner previously described.

Figure 13:
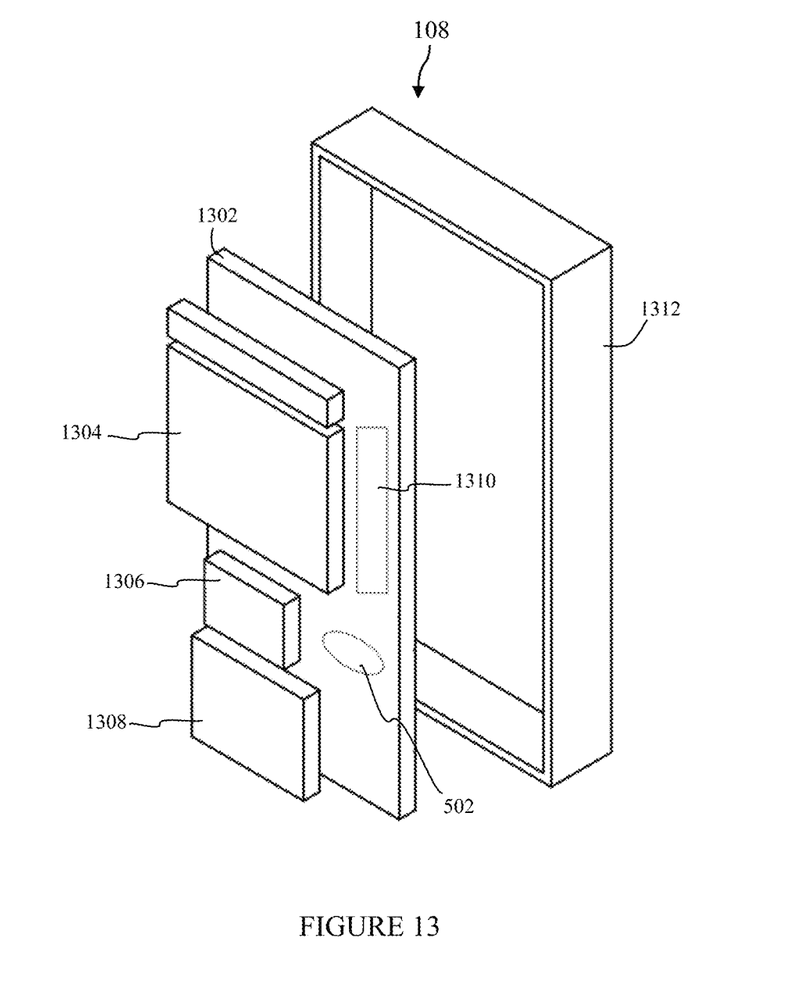
FIG. 13 representatively illustrates a block diagram of a card reader for the modular entry system in accordance with an exemplary embodiment of the present technology.

Although the foregoing embodiments are discussed with principal reference to the card reader 108 in conjunction with the modular entry system 100, the technology should not be viewed as being limited in this respect as each method could also be used in connection with one or more other type of controllable smart devices and smart sensors. For example, the card reader 108 may be used with other devices not associated with the modular entry system 100. In this embodiment, the card reader 108 may exist as a standalone device that is configured to function in cooperation with devices such as vending machines, light controllers, environmental controllers, or the like. Referring now to FIG. 13, in this configuration, the card reader 108 may comprise a circuit board 1302, an antenna 1304, a CPU 1306, a NFC reader/antenna 1308, and a BLE antenna 1310 located within a housing 1312.

Figure 12A:
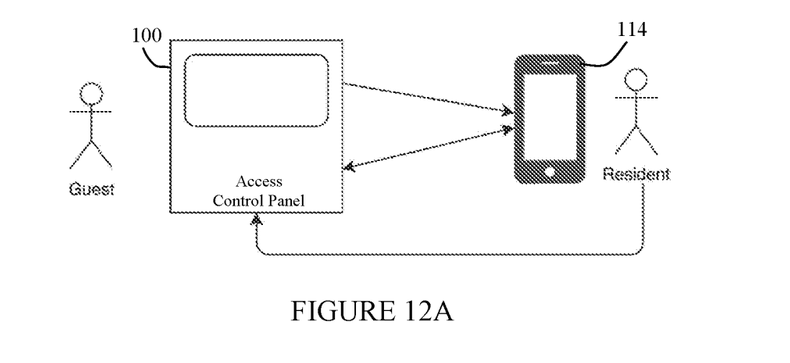
FIG. 12A representatively illustrates a video call of the telephone entry system shown in FIG. 8 in accordance with an exemplary embodiment of the present technology.
Figure 12B:
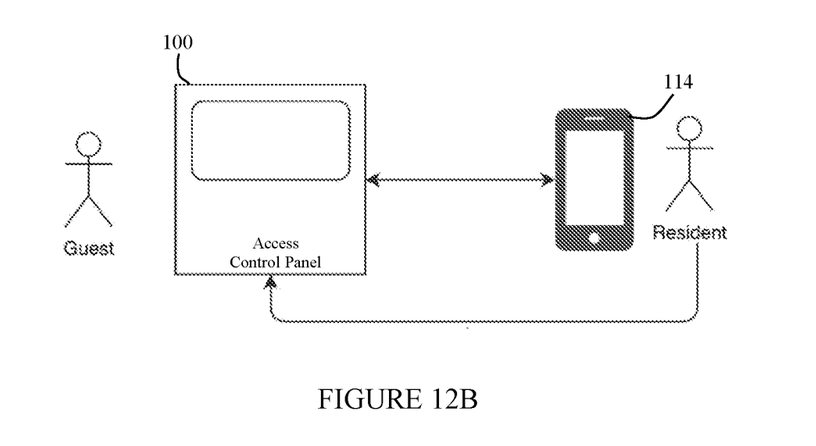
FIG. 12B representatively illustrates a VoIP call of the telephone entry system shown in FIG. 8 in accordance with an exemplary embodiment of the present technology.
Figure 12C:
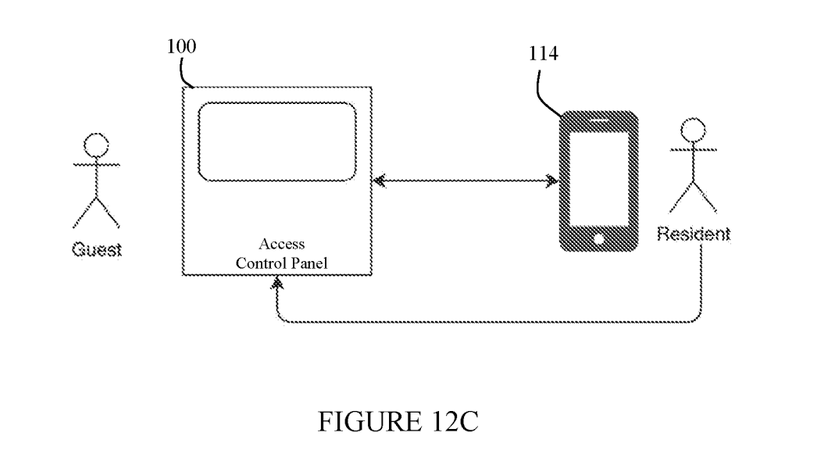
FIG. 12C representatively illustrates a text message of the telephone entry system shown in FIG. 8 in accordance with an exemplary embodiment of the present technology.

The intercom system 110 may be configured to make video calls from the modular entry system 100 to a residence via a mobile software application, or a Voice over IP (VoIP) call to a phone number associated with the residence or property manager. For example, and referring now to FIG. 12A, when a guest at the modular entry system 100 makes a video call to a resident to request access, a one-way video/two-way voice call is initiated. The resident may then choose to admit or deny the user entry through the access point. In another embodiment, as shown FIG. 12B, a guest may initiate a VoIP call to the user device 804 of a resident via a telephone number associated with the user device 804. The resident may communicate with the guest over a two-way voice call and the resident may admit or deny the user entry through the access point. In yet another embodiment, as shown in FIG. 12C, the guest at the modular entry system 100 may initiate a text message conversation with a resident. The resident may respond via text message to admit or deny the user entry through the access point.

Figure 14:
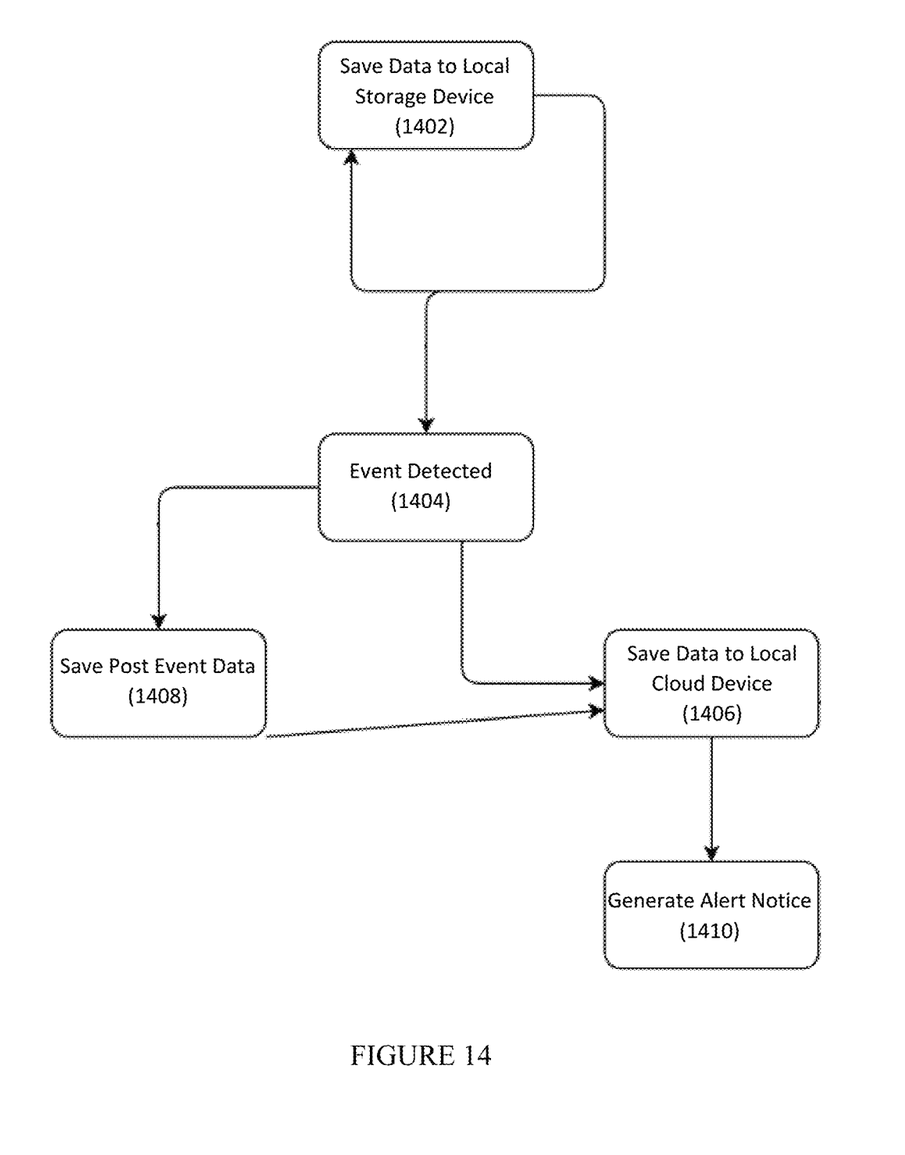
FIG. 14 representatively illustrates a damage monitoring system for the modular entry system in accordance with an exemplary embodiment of the present technology.

Referring now to FIG. 14, the modular entry system 100 may also comprise a damage monitoring system. The damage monitoring system may comprise any suitable combination of hardware and software components adapted to monitor a condition of the modular entry system 100 and any associated components. In one embodiment, the main logic board 102 may be configured to use one or more components such as the camera 112, microphone 114, and one or more accelerometers 120 to monitor the operational status of the modular entry system 100. For example, the camera 112 may provide a video feed or discrete image frames to the main logic board 102 for temporary storage on a local storage device (1402) or in a remote storage device such as a cloud server. The main logic board 102 may store the video feed or images according to any desired criteria such as a predetermined time frame as may be common with prior art security systems.

The accelerometer(s) 120 may be configured to generate a signal in response to an event exceeding a predetermined threshold. For example, an accelerometer 120 installed within the housing 202 may be configured to generate an event signal in response to detecting an impact exceeding a predetermined g-force (1404). Similarly, the main logic board 102 may be configured to generate an event signal in response to the microphone 114 detecting a sound over a predetermined decibel level.

In response to the generated event signal, the main logic board 102 may initiate a data collection process to collect data corresponding to the time frame of the detected event. For example, the main logic board 102 may initiate a response that sends a predetermined amount of the video or image data collected prior to the generated event signal to a cloud server or other storage system (1406). The initiated response may also cause the main logic board 102 to save video or image data for a predetermined amount of time after the event signal is generated and send that data to the same location as the pre-event data (1408). The main logic board 102 may also trigger other systems, such as the microphone 114, to record data for saving and transfer to the cloud server. The main logic board 102 may also run an operational status check or self-diagnostic test to determine if one or more components are functional. The results of the status check may also be forwarded to the cloud server.

Once the data has been collected, the damage monitoring system may send an alert to a predetermined location (e.g., phone number, e-mail address, mobile application, web server, etc.) to provide a notification of the event (1410). The alert may contain the collected data so that the recipient of the alert may be able to review the data and determine the state of the modular entry system 100.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Although embodiments of the present technology have been described with reference to a controlled access entry system, the technology should not be viewed as being limited in that respect. As would be familiar with one of ordinary skill in the art after becoming familiar with the teachings of the present technology, the subject matter could also be used to any multiple unit property, such as office buildings, co-working spaces, office suite facilities, continuing care facilities (e.g., nursing homes, assisted living communities), and the like.

As described herein, embodiments of each disclosed system have been described as being integrated within a single system and variously with each other; however, the technology should not be viewed as being limited in this respect. In some embodiments, each system may comprise a stand-alone system such that they may each be employed separately or in various combinations with one another or as integrated with other types of smart access systems.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

The invention claimed is:

1. A modular entry system capable of conducting a device-to-device communication transaction with a wireless user device, comprising:
   a main logic controller;
   a card reader electrically coupled to the main logic controller and configured to conduct a secure communication transaction with the user device, wherein:
      a first communication from the card reader to the user device occurs over a first communication path and includes the card reader broadcasting a unique device ID;
      in response to the user device detecting the first communication, a second communication from the card reader to the user device is initiated and occurs over a second communication path, wherein a NFC tag having a unique set of identification data comprising a nonce is communicated to the user device; and
      in response to the user device receiving the nonce, a third communication from the user device to the card reader occurs over a third communication path, wherein:
         the user device sends an encrypted message comprising an access request to the card reader using the received nonce; and
         the third communication path comprises a different wireless protocol than the second communication path.

2. A modular entry system capable of communicating with a wireless user device according to claim 1, wherein the NFC tag further comprises:
   a uniform resource identifier;
   a device identifier;
   a transaction header;
   and
   a set of action information.

3. A modular entry system capable of communicating with a wireless user device according to claim 2, wherein:
   the first communication path comprises a Bluetooth low energy (BLE) advertisement;
   the second communication path comprises a NFC protocol; and
   the third communication path comprises a BLE protocol.

4. A modular entry system capable of communicating with a wireless user device according to claim 3, wherein the secure communication transaction will time out if the third communication does not occur within a predetermined time frame after the second communication.

5. A modular entry system capable of communicating with a wireless user device according to claim 2, wherein:
   the first communication path comprises broadcasting the unique device ID through a BLE advertisement from the card reader to the user device;
   the second communication path comprises a BLE protocol; and
   the third communication further comprises the user device emulating the NFC tag to the card reader along with a user access code over a NFC protocol.

6. A modular entry system capable of communicating with a wireless user device according to claim 5, wherein the secure communication transaction will time out if the third communication does not occur within a predetermined time frame after the second communication.

7. A modular entry system capable of communicating with a wireless user device according to claim 1, further comprising:
  a housing having an interior volume for securing the main logic controller, an intercom system, and the card reader; and
  an access panel configured to move between an open position and a closed position to provide access to the interior volume.

8. A modular entry system capable of communicating with a wireless user device according to claim 1, further comprising:
  an accelerometer electrically coupled to the main logic controller and configured to generate a signal in response to a detected event exceeding a predetermined threshold; and
  a damage monitoring system responsive to the accelerometer and configured to:
    monitor the operational status of the modular entry system;
    save a set of event data in response to the generated signal; and
    send an alert notice comprising the saved set of event data.

9. A modular entry system capable of communicating with a wireless user device according to claim 1, further comprising an intercom system electrically coupled to the main logic controller.

10. A method for transacting a secure communication between a modular entry system and a wireless user device, comprising:
  establishing a wireless connection between a card reader and the user device;
  conducting a first communication from the card reader to the user device over a first communication path and includes the card reader broadcasting a unique device ID;
  in response to the user device detecting the first communication, conducting a second communication from the card reader to the user device over a second communication path, wherein a NFC tag having a unique set of identification data comprising a nonce is communicated to the user device; and
  in response to the user device receiving the nonce, conducting a third communication from the user device to the card reader over a third communication path, wherein:
    the user device sends an encrypted message comprising an access request to the card reader using the received nonce; and
    the third communication path comprises a different wireless protocol than the second communication path.

11. A method for transacting a secure communication between a modular entry system and a wireless user device according to claim 10, further comprising assigning a near-field communication (NFC) tag with the card reader, wherein the NFC tag has a unique set of identification data, comprising:
  a uniform resource identifier;
  a device identifier;
  a transaction header; and
  a set of action information.

12. A method for transacting a secure communication between a modular entry system and a wireless user device according to claim 11, wherein:
  the first communication path comprises a Bluetooth low energy (BLE) advertisement;
  the second communication path comprises a NFC protocol; and
  the third communication path comprises a BLE protocol.

13. A method for transacting a secure communication between a modular entry system and a wireless user device according to claim 12 wherein the secure communication transaction will time out if the third communication does not occur within a predetermined time frame after the second communication.

14. A method for transacting a secure communication between a modular entry system and a wireless user device according to claim 11, wherein:
  the first communication path comprises broadcasting the unique device ID through a BLE advertisement from the card reader to the user device;
  the second communication path comprises a BLE protocol; and
  conducting the third communication further comprises the user device emulating the NFC tag to the card reader along with a user access code over a NFC protocol.

15. A method for transacting a secure communication between a modular entry system and a wireless user device according to claim 14, wherein the secure communication transaction will time out if the third communication does not occur within a predetermined time frame after the second communication.

16. A method for transacting a secure communication between a modular entry system and a wireless user device according to claim 10, further comprising:
  coupling a main logic controller to the card reader;
  coupling an accelerometer electrically to the main logic controller, wherein the accelerometer is configured to generate a signal in response to a detected event exceeding a predetermined threshold; and
  a damage monitoring system responsive to the accelerometer and configured to:
    monitor the operational status of the modular entry system;
    save a set of event data in response to the generated signal; and
    send an alert notice comprising the saved set of event data.

17. A modular entry system capable of conducting a device-to-device communication transaction with a wireless user device, comprising:
  a main logic controller;
  a card reader electrically coupled to the main logic controller and configured to conduct a secure communication transaction with the user device, wherein:
    a first communication from the card reader to the user device wherein, the card reader is configured to broadcast a unique device ID;
    in response to the user device detecting the first communication, a second communication from the card reader to the user device is initiated, wherein a data packet having a unique set of identification data comprising a nonce is communicated to the user device; and
    in response to the user device receiving the nonce, a third communication from the user device to the card reader occurs, wherein the user device sends an encrypted message comprising an access request to the card reader using the received nonce.

18. A modular entry system capable of communicating with a wireless user device according to claim 17, wherein the data packet further comprises:
- a uniform resource identifier;
- a device identifier;
- a transaction header; and
- a set of action information.

19. A modular entry system capable of communicating with a wireless user device according to claim 18, wherein:
- the first communication path comprises a Bluetooth low energy (BLE) advertisement;
- the second communication path comprises communicating a NFC protocol; and
- the third communication path comprises a BLE protocol.

20. A modular entry system capable of communicating with a wireless user device according to claim 18, wherein:
- the first communication path comprises broadcasting the unique device ID through a BLE advertisement from the card reader to the user device;
- the second communication path comprises a BLE protocol; and
- the third communication further comprises the user device emulating the data packet to the card reader along with a user access code over a NFC protocol.

* * * * *